United States Patent [19]

Tanaka et al.

[11] 3,904,587

[45] Sept. 9, 1975

[54] PROCESS FOR THE PRODUCTION OF POLYMERS CAPABLE OF SELF-CURING AT ROOM TEMPERATURE AND PRODUCTS THEREOF

[75] Inventors: Yoshio Tanaka; Masao Kato; Akira Okada, all of Yokohama; Yukio Shimura, Fujisawa, all of Japan

[73] Assignee: Director-General of the Agency of Industrial Science & Technology, Tokyo, Japan

[22] Filed: Oct. 26, 1972

[21] Appl. No.: 301,077

[30] Foreign Application Priority Data
Oct. 27, 1971  Japan............................... 46-85342

[52] U.S. Cl. ... 260/77.5 BB; 260/32.8 EP; 260/33.2 EP; 260/33.6 EP; 260/33.8 EP; 260/42.21; 260/6 BN; 260/78.5 UA; 260/79.3 M; 260/80 NC; 260/80.3 E; 260/80.3 N; 260/80.3 R; 260/82.1; 260/85.5 B; 260/85.7; 260/86.1 N; 260/87.5 E; 260/87.7; 260/88.1 P; 260/88.1 PA; 260/88.1 PN; 260/88.3 A; 260/88.3 R; 117/132 B

[51] Int. Cl....... C08g 22/04; C08f 1/08; C08f 17/00
[58] Field of Search..... 260/77.5 BB, 80.72, 80 NC, 260/80.3 E, 80.3 N, 80.3 R, 88.3 A, 88.3 R

[56] References Cited
UNITED STATES PATENTS
2,687,404  8/1954  Robertson........................ 260/85.7
2,910,459  10/1959  Rothrock et al................... 260/86.1

*Primary Examiner*—Stanford M. Levin
*Attorney, Agent, or Firm*—William J. Daniel

[57] ABSTRACT

A polymer capable of self-curing or cross-linking at room temperature is produced by free radical polymerization in a non-protonic solvent of:

A.
  i. a combination of (a) at least one ethylenically unsaturated compound having an epoxy group and (b) at least one ethylenically unsaturated compound having a tertiary amino group selected from the group consisting of an N,N-disubstituted amino group, a pyridyl group, a quinolyl group and an isoquinolyl group or
  ii. at least one ethylenically unsaturated compound having one epoxy group and one tertiary amino group selected from the group consisting of an N,N-disubstituted amino group, a pyridyl group, a quinolyl group and an isoquinolyl group, and optionally B. at least one free radical-copolymerizable ethylenically unsaturated compound other than the ethylenically unsaturated compounds (i) and (ii) and which is free of active hydrogen atoms.

4 Claims, No Drawings

PROCESS FOR THE PRODUCTION OF POLYMERS CAPABLE OF SELF-CURING AT ROOM TEMPERATURE AND PRODUCTS THEREOF

FIELD AND BACKGROUND OF THE INVENTION

This invention relates to a process for the production of resins or polymers capable of self-curing, i.e., cross-linking without special measures. More particularly, this invention relates to a process for the production of polymers which are capable of undergoing self-curing at room temperature and have pendant epoxy and tertiary amino groups in the main molecular chain.

It is known that thermoplastic resins are prepared by polymerizing an ethylenically unsaturated compound alone or together with another ethylenically unsaturated compound. However, when an epoxy resin is produced according to this mechanism, a number of practical drawbacks are encountered. The resultant resins cannot be readily preserved for a long period of time because of their short pot-life and difficulties arise in selecting a compatible adequate curing agent suitable for curing epoxides.

Heretofore, a copolymer having in the molecular epoxy groups in combination with amino groups which contribute a curing function similar to a curing agent has been prepared in an attempt to overcome the drawbacks of these epoxy resins. In this case, however, the curing effect of amino groups for epoxy groups is accelerated at a temperature in the neighborhood of the polymerization temperature of the copolymer. Thus, gelation takes place before the copolymerization is sufficiently advanced and it is impossible to obtain the desired end product or, if obtained, the product is very poor in stability on storage and is of no practical value. To inhibit gelation during the preparation of the copolymer for obtaining a stable product, there has been proposed a process for producing thermocurable resins wherein there is used as a curing agent an imidazole compound which is low in curing accelerating effect for epoxy groups and has a relatively high activation temperature (see Japanese Pat. Publication No. 1869/68). However, the use of the thermocurable resins thus obtained is narrowly limited for the reason that they have to be heated on curing to a temperature of at least 80°C and are, moreover, low in mechanical strength.

It is also known that polymers capable of self-curing at room temperature can be produced by copolymerizing together an ethylenically unsaturated compound free of radicals capable of reacting with epoxy groups, a glycidyl ester of an ethylenically unsaturated carboxylic acid and an ethylenically unsaturated compound having radicals capable of reacting with glycidylepoxy groups (British Pat. No. 1,076,051). However, these polymers need a considerably longer time for self-curing and, hence, the addition of a curing accelerator is recommended for shortening the curing time. Again, according to R. W. Apson et al., polymers with antistatic properties can be produced by introducing into the main molecular chain pendant epoxy groups and quaternary salt residues (Japanese Pat. Publication No. 2993/59). However, the polymers thus obtained are incapable of self-curing at room temperature.

Accordingly, polymers which can be stored for a long period of time with high stability but are capable of undergoing self-curing at a practical curing rate at room temperature without the necessity of any additional curing accelerators or other special measures on actual use remain a desirable objective in the art.

GENERAL DESCRIPTION OF THE INVENTION

As the results of extensive research on the production of resins capable of self-curing at room temperature, it has now been found unexpectedly that in the polymerization of a monomer having an epoxy group and a monomer having a tertiary amino group or in the polymerization of a monomer having in the same molecule both an epoxy group and a tertiary amino group, the use of a non-protonic solvent serves to promote the reaction smoothly to yield the desired polymer without occurrence of gelation even in the presence of a monomer being an amino group having a low activation temperature for epoxy groups, that is, which would normally activate epoxy groups even at low temperature. This invention is based on this discovery.

In accordance with one embodiment of this invention, resins or polymers capable of self-curing at room temperature can be prepared by free radical copolymerization in a non-protonic solvent of at least one ethylenically unsaturated monomer having an epoxy group and at least one ethylenically unsaturated monomer having a tertiary amino group selected from the group consisting of an N,N-disubstituted amino group, a pyridyl group, a quinolyl group and an isoquinolyl group.

Ethylenically unsaturated monomers having an epoxy group which are utilizable as a starting material for this invention are represented by the general formula:

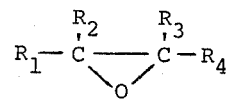

wherein at least one of the radicals $R_1$, $R_2$, $R_3$ and $R_4$ is a residue containing an ethylenically unsaturated linkage. The other residues $R_1$-$R_4$ can be a hydrogen atom, any inert organic radical, and can be combined to form a ring structure. Illustrative ethylenically unsaturated monomers having an epoxy group are, for example, glycidylethers, such as allyl glycidyl ether, o-allyl-phenyl glycidyl ether and p-vinylphenyl glycidyl ether; alkylene oxides, such as butadiene monooxide and divinylcyclohexene monooxide; glycidyl esteres, such as glycidyl acrylate, glycidyl methacrylate, methyl glyidyl itaconate, allyl glycidyl phthalate and glycidyl p-vinylbenzoate; alkenyl esters of epoxy acids, such as 10,11-epoxyundecanoic acid vinyl ester; alkenyl glycidyl urethans, such as N-vinylglycidylurethane and N-methyl-N-vinylglycidyl-urethane; glycidyl vinylsulfonate and dimethyl-vinyl-(2,3-epoxypropxy-silane).

The epoxy-substituted monomer and an ethylenically unsaturated monomer having an N,N-disubstituted amino group, a pyridyl group, a quinolyl group or an isoquinolyl group can be employed in any desired ratio.

However, the proportion of both components in the resin will be affected by the relative reactivity of these components. To obtain a self-curable resin according to this invention, only a small amount, for example, about 5 mol percent, of the tertiary amino-substituted ethylenically unsaturated monomer is needed to achieve sufficient curing. Illustrative of the ethylenically unsaturated monomer having a tertiary amino group are olefins, alkenyl ethers and unsaturated esters having a tertiary amino group selected from an N,N-disubstituted amino group, a pyridyl group, a quinolyl group and an isoquinolyl group, such as N,N-dimethylaminostyrene, N,N-diethylaminoethyl vinyl ether, vinylpyridine, vinylquinoline, vinylisoquinoline, trans-1,2-dipyridylethylene, 2-methyl-5-vinylpyridine, 2-vinyl-5-ethylpyridine, 3-cinnamoylpyridine and 2-methyl-5-cinnamoylpyridine.

The monomeric components may be used alone or in combination of more than one.

In accordance with an alternative embodiment of this invention, the desired polymers capable of self-curing at room temperature can be prepared by free radical polymerization in a non-protonic solvent of an ethylenically unsaturated monomer carrying in the same molecules both an epoxy group and a tertiary amino group. Examples of such monomers include epoxyaminostyrenes, such as p-[N-methyl-N-(1,2-epoxypropyl)-amino]-styrene and p-[N,N-di(1,2-epoxypropyl)-amino]-styrene; epoxyvinylpyridines, such as 3-(1,2-epoxypropyl)-4-vinylpyridine and 3-(1,2-epoxypropyl)-5-vinylpyridine; vinylaminoglycidyl ethers, such as p-(N-methyl-N-vinylaminoethyl)-phenyl glycidyl ether and p-(N-ethyl-N-vinylaminoethyl)-phenyl glycidyl ether; nitrogen-containing heterocyclic vinyl glycidyl compounds, such as glycidyl 3-vinylquinoline-4-carboxylate, vinyl 4-(1,2-epoxypropyl)-quinoline-3-carboxylate, 4-vinyl-3-(1,2-epoxypropyl)-isoquinoline and vinyl glycidyl quinolinate. These compounds may be used alone or in mixture of more than one.

In addition to (i) a mixture of an ethylenically unsaturated monomer having an epoxy group and the ethylenically unsaturated monomer having a specified tertiary amino group or (ii) an ethylenically unsaturated monomer having both an epoxy group and the specified tertiary amino group, another copolymerizable ethylenically unsaturated monomer may optionally be used in this invention. Examples of such optional ethylenically unsaturated monomers include olefins, such as ethylene, propylene and isobutylene; halogenated olefins, such as vinyl chloride, vinylidene chloride, allyl chloride and allyl bromide; esters and amides of unsaturated carboxylic acids, such as methyl acrylate, ethyl methacrylate, acrylamide and methacrylamide; vinyl esters of fatty acids, such as vinyl acetate and vinyl propionate; allyl ester of fatty acids, such as allyl acetate and allyl propionate; unsaturated nitriles, such as acrylonitrile and methacrylonitrile; vinyl ethers, such as ethyl vinyl ether, propyl vinyl ether and phenyl vinyl ether; aromatic compounds having a vinyl substituent, such as styrene and vinyl naphthalene; vinyl ketones, such as methyl vinyl ketone and ethyl vinyl ketone; vinyl thioethers, such as vinyl ethyl sulfide and vinyl isopropyl sulfide; vinyl sulfones, such as vinyl ethyl sulfone and vinyl propyl sulfone; vinyl sulfoxides, such as vinyl butyl sulfoxide and vinyl propyl sulfoxide; heterocyclic compounds containing a vinyl substituent, such as 2-vinylthiophene, 2-vinyl furan, 2-vinyldibenzofuran and 2-vinylphenoxazine. Besides these monomers, cyclic unsaturated monomers such as cyclohexane, N-ethylmaleimide and maleic anhydride can also be used. However, monomers having a substituent containing one or more active hydrogen atoms, such as a primary amino group, secondary amino group, carboxylic group or hydroxy group, for example, allylamine, acrylic acid and p-vinylphenol, cannot be used as they attack epoxy groups under the polymerization conditions.

Such copolymerizable ethylenically unsaturated monomers are used in an amount of 0.1–10,000 mol percent, preferably 0.5–1,000 mol percent based on the epoxy-substituted ethylenically unsaturated monomer.

It is essential to conduct the polymerization of this invention in a non-protonic solvent. Any non-protonic solvent can be used in this invention so long as it dissolves the epoxide- and tertiary amine-substituted starting monomers but are not reactive therewith. However, those which easily undergo decomposition or coloration, for example, nitrobenzene, etc., are not preferred for use in this invention. Preferred non-protonic solvents include, for example, aromatic hydrocarbons, such as benzene and toluene; ketones, such as acetone and methyl ethyl keton; ethers, such as diethyl ether and tetrahydrofuran; and amides, such as dimethylformamide and dimethylsulfoxide. Although halogenated hydrocarbons, such as chloroform may also be used, they permit the formation of low molecular weight polymeres and so are not suitable when the preparation of high molecular weight polymers is desired.

These solvents should not contain any active hydrogen compound, such as water, alcohol, phenol, acid, primary amine or secondary amine. Thus, the solvents should be purified or refined prior to actual use.

In the process of this invention, it is essential for the monomeric component or components to undergo free radical polymerization without reaction of the epoxy groups. This free radical polymerization can be carried out in a manner conventionally adopted for free radical polymerization generally by the aid of a free radical initiator or by irradiation with ionizing radiation such as $\gamma$-rays or by irradiation with ultraviolet rays in the presence of a light sensitizing agent. Utilizable as the free radical initiator are, for example, organic peroxides, such as p-methoxybenzoyl peroxide, lauroyl peroxide and cumene hydroperoxide; inorganic peroxides, such as potassium peroxide; and azo compounds, such as 2,2'-azo-bis-isobutyronitrile. The free radical initiator is added in an amount of 0.01–10 percent by weight based on the monomers to a solution of the monomers and then the polymerization is effected in vacuo or in an inert gas atmosphere by heating the solution at 50°–100°C. The polymerization time is usually within 0.5–200 hours.

In case ionizing radiation is employed, $Co^{60}$, $Cs^{137}$ or the like is used as an irradiation source and the polymerization is carried out at a temperature as low as 0°–50°C. In this case, the polymerization time is within about 0.5–500 hours.

In case irradiation by ultraviolet rays is applied, benzoin, benzophenone or the like is used as a light sensitizing agent which is added in an amount of 0.001–10 percent by weight based on the monomers. The irradiation of ultraviolet rays is effected at 0°–50°C by using a high voltage or low voltage mercury lamp or xenon lamp. In this case, the polymerization will be finished usually within 0.5–100 hours. In either of the abovementioned polymerization reaction modes, the polymerization time will depend on the kind and magnitude of the irradiation.

A precipitating agent, such as petroleum ether, is added to the resulting reaction mixture to separate the desired polymer which can be obtained in the form of a paste or powder by drying the precipitated polymer under reduced pressure or in an inert gas atmosphere.

The resin obtained according to the process of this invention is very stable as a solution in a solvent or in an atmosphere free from oxygen or moisture. However, the presence of oxygen permits sufficient curing or cross-linking of the resin even at room temperature to form an insoluble resin. This cured product is excellent in flexibility, impact strength and chemical resistance in contrast to cured products derived from known low molecular weight epoxy resins.

It is hypothesized that curing of the self-curable resin of this invention is achieved by cross-linking or a three-dimensional network structure of the epoxy groups pendant from the main linear polymer chain or backbone with epoxy groups of adjacent molecules as a result of the catalytic action of the tertiary amino groups. this conclusion is supported by a series of infrared absorption spectrographs where an absorption band originally present at around 850 cm$^{-1}$ (corresponding to an epoxy linkage) is weakened as the curing proceeds, while an absorption band at around 1,110 cm$^{-1}$ (corresponding to an ether linkage) is intensified as the curing proceeds. The fully cured resin is no longer soluble in a solvent.

The self-curable resin obtained according to the process of this invention has a long pot life or working time and can easily be cured at room temperature or by heating without the necessity of any curing agent. Accordingly, the resin is especially suitable for one-component drying paints, adhesives and case moldings.

PREFERRED EMBODIMENTS OF THE INVENTION

This invention will be explained in more detail by way of examples wherein all parts and percentages are by weight unless otherwise indicated.

EXAMPLE 1

In 200 parts of tetrahydrofuran are dissolved 95 parts of p-vinylphenyl glycidyl ether, 5 parts of 2-vinylpyridine and 0.5 part of azo-bis-isobutyronitrile. A large hard glass test tube is charged with the solution and then sealed while maintained in vacuo. The sealed test tube is placed in a constant temperature box maintained at 60°C where the test tube is shaken for 2 days. After completion of the reaction, the tube is opened and petroleum ether added to the reaction mixture to precipitate the polymeric product. After separation, the polymeric product is dried at room temperature under reduced pressure. The desired copolymer is thus obtained in a yield of 98 percent which is soluble in chloroform, tetrahydrofuran and methyl isobutyl ketone and has a 2-vinylpyridine content of 9.4 percent and a $\eta sp/C$ of 0.3 (in tetrahydrofuran). This copolymer is stable over one month in argon atmosphere. Elementary analysis:

C: 74.27%  H: 7.07%  N: 0.17%

This copolymer is dissolved in a solvent and casted over a plate to form thereon a film having a thickness of about 0.1 mm. After drying at normal pressure for 24 hours, the film is insoluble in any of the above-identified solvents.

Infrared spectrum analysis shows that epoxy groups apparent in the initial soluble copolymer are significantly decreased in the insoluble copolymer.

A film cured by treating it at 80°C for 20 minutes has a Gardner impact strength (22 gauge steel) of 170 inch-pounds and shows no change in a one-eighth-inch bending test. In addition, no change is observed when the film is immersed into toluene and gasoline for 24 hours.

EXAMPLE 2

In 200 parts of benzene are dissolved 90 parts of vinylcyclohexene monoxide, 10 parts of 2-vinylquinoline and 1 part of benzoyl peroxide. The solution is charged into a test tube the same as in Example 1 and the air occuplied in the test tube replaced with nitrogen. The test tube is tightly sealed and maintained at 40°C for 24 hours and then at 60°C for 24 hours to effect polymerization reaction. After opening of the tube, petroleum benzine is added to the reaction mixture to precipitate the polymeric product. This precipitation method is repeated for purification and then the product is dried at room temperature in dry nitrogen atmosphere. The desired copolymer is thus obtained in a yield of 100 percent which has a vinylquinoline content of 8.5 percent and a polymerization degree (VPO) of about 5000. No change is observed when this soluble resin is stored for one month in dry argon gas. The resin is then dissolved in acetone to form a solution from which a film is prepared. When the film is air dried, it becomes insoluble after 1 day. The film is then treated at 80°C for 10 minutes and tested for determining its various properties. The test results show that the film has a Sward-Rocker hardness of 51 and a Gardner impact strength (22 gauge steel) of 170 inch-pounds and shows no change when immersed in toluene and gasoline for 48 hours.

EXAMPLE 3

In 300 parts of acetone are dissolved 85 parts of glycidyl methacrylate, 15 parts of 4-vinylisoquinoline and 0.01 part of benzophenone. In argon atmosphere, the solution is irradiated for 10 hours at 30°C by ultraviolet rays from a 400W high voltage mercury lamp disposed at a distance of 30 cm. The soluble resin thus obtained contains 3% of vinylisoquinoline unit and gives an insoluble, infusible film when air dried and then heated at 100°C for 30 minutes. This film has a Sward-Rocker hardness of 50 and a Gardner impact strength (22 gauge steel) of 170 inch-pounds and shows no change when immersed in toluene and gasoline for 48 hours.

The soluble resin can be stored with high stability in argon atmosphere for one month.

EXAMPLE 4

A glass tube is charged with 98 parts of glycidyl acrylate, 2 parts of 4-vinyl-2-methylpyridine and 100 parts of ethyl ether. The air in the tube is expelled and the tube is then sealed tightly. The tube is irradiated at 30°C for 200 hours by $\gamma$-rays ($2.18 \times 10^4$ $\gamma$/hour) from Co$^{60}$.

The resulting soluble resin contains 4% of vinylmethylpyridine unit and is not cured when stored at room temperature in nitrogen atmosphere for one month. The soluble resin is converted into insoluble, infusible resin when the former is air dried and heated at 90°C for 30 minutes to permit curing. The cured resin has a Gardner impact strength (22 gauge steel) of 170 inch-pounds and shows no change when immersed in toluene and gasoline for 48 hours.

EXAMPLE 5

In a manner similar to that described in Example 1, 95 parts of allyl glycidyl ether and 5 parts of p-(N,N-dimethylamino)-styrene in toluene are reacted in the presence of 0.5 part of azo-bis-isobutyronitrile. The resulting soluble resin is converted into an insoluble, infusible resin when air dried for 24 hours. The cured resin has a Sward-Rocker hardness of 40 and shows no change when immersed in toluene and gasoline for 48 hours.

The soluble resin is stored in dry state for at least one month and then tested for determination of its epoxy groups whereby no change is observed in the epoxy groups.

EXAMPLE 6

In 100 parts of benzene are dissolved 100 parts of 3-(1,2-epoxy-propyl)-4-vinylpyridine and 1.5 parts of benzyl peroxide. A hard test tube is charged with the solution, sealed in vacuo and maintained at 60°C for 48 hours to effect polymerization reaction. Petroleum ether is poured into the resulting reaction mixture and the precipitate formed is collected by filtration. A soluble polymer is thus obtained in a yield of 98 percent which converts by drying at room temperature for 24 hours in the air into an insoluble, infusible polymer.

One hundred parts of the soluble polymer is dissolved in 50 parts of benzene and 50 parts of methyl isobutyl ketone and the solution is spread to form a film which is then dried at 80°C for 15 minutes to form a cured film. A Gardner impact strength (22 gauge steel) of this cured film is 172 inch-pounds. No change is observed in a bending test (one-eighth-inch bending) and also in a test wherein the cured film is immersed in toluene (48 hours) and gasoline (48 hours).

An infrared absorption spectrum analysis shows that epoxy groups in the soluble polymer are virtually absent in the cured resin.

EXAMPLE 7

In 50 parts of benzene and 80 parts of dioxane are dissolved 100 parts of N-allyl-N-epoxypropylaniline and 1.0 part of cumene hydroperoxide. The solution is charged into a steel reactor and the air occupied therein is replaced with argon. The reaction is carried out at 50°C for 2 days and the reaction mixture is then worked up in a manner similar to that described in Example 6 to obtain a white yellow polymer in a yield of 90 percent. This polymer is stable for at least one month in an inert gas atmosphere or under reduced pressure drying. A film obtained from a solution of 30 parts of this polymer dissolved in 60 parts of methyl ethyl ketone and 30 parts of benzene is dried in the air under atmospheric pressure to form a film of an insoluble, infusible cured resin. After heating at 100°C for 10 minutes, the cured film has a Sward-Rocker hardness of 50 and shows no change when immersed in toluene for 48 hours.

EXAMPLE 8

A glass tube similar to that described in Example 6 is charged with 50 parts of N-vinylglycidylurethane dissolved in 100 parts of a mixed solvent (1:1) of acetone and ethyl ether and sealed while expelling the air in the tube. The mixture is irradiated at 30°C for 200 hours by $\gamma$-rays ($2.18 \times 10^4$ $\gamma$/hour) from $Co^{60}$ and then worked up in a manner similar to that described in Example 1 to obtain in a yield of 70 percent a polymer soluble in the solvent. A solution of 10 parts of this resin in 40 parts of ethyl acetate and 10 parts of acetone undergoes no increase in viscosity even when allowed to stand at room temperature for one month or longer. A film obtained from the solution is converted by air drying and subsequent heating at 90°C for 10 minutes into an insoluble, infusible film which shows no change when immersed in toluene or gasoline for 48 hours. The cured film has a Sward-Rocker hardness of 45.

EXAMPLE 9

In 100 parts of dimethylsulfoxide and 50 parts of ethyl acetate are dissolved 100 parts of glycidyl 3-vinyl-quinoline-4-carboxylate and 1 part of azo-bis-isobutyronitrile. The solution is charged into a vessel similar to that described in Example 6 and maintained at 60°C for 24 hours and then at 50°C for 24 hours to effect reaction. After the reaction, 100 parts of the solvent are removed under reduced pressure.

Petroleum ether is poured into the resulting reaction mixture and the precipitate formed is collected by filtration to obtain in a yield of 90 percent a yellowish white powdery polymer soluble in the solvents and acetone. No change is observed in this polymer when it is allowed to stand for one month in an inert gas atmosphere or under reduced pressure drying, but the polymer is converted by heating at 60°C for 10 minutes or 80°C for 5 minutes into an insoluble, infusible resin. The cured resin in the form of a film has a Sward-Rocker hardness of 50. No change is observed in a bending test (one-eighth-inch bending) and also in a test wherein the cured resin is immersed in toluene (58 hours) and gasoline (48 hours).

EXAMPLE 10

In 500 parts of tetrahydrofuran are dissolved 95 parts of glycidyl methacrylate, 5 parts of 2-vinylpyridine and 100 parts of styrene and 1 part of 2,2-azo-bis-isobutyronitrile. A hard test tube is charged with the solution, sealed in vacuo and shaken for 2 days in a constant temperature bath maintained at 50°C. The test tube is then opened and petroleum ether is added to the resulting reaction mixture to precipitate a polymeric product. The precipitate is dried at room temperature under reduced pressure. The yield of the product is 95 percent. The resulting copolymer is in the form of white powder and soluble in tetrahydrofuran, methyl ethyl ketone, benzene, etc. The composition of the copolymer according to elementary analysis are as follows: 4.6 percent 2-vinylpyridine unit, 57.3 percent glycidyl methacrylate unit and 38.1 percent styrene unit. A copolymer has a $\eta sp/C$ (in tetrahydrofuran) of 0.11. When the copolymer is reprecipitated and dried in the air under atmospheric pressure, the copolymer becomes insoluble in the solvents. A film obtained from the soluble polymer becomes insoluble and infusible when it is air dried for 24 hours. An infrared absorption spectrum analysis shows that epoxy groups in the soluble copolymer disappear in the insoluble, infusible cured copolymer, thus making it possible to conclude that the cured copolymer has a three-dimensional structure.

EXAMPLE 11

In 400 parts of acetone are dissolved 90 parts of p-vinylphenyl glycidyl ether, 5 parts of 2-vinylquinoline, 105 parts of methyl methacrylate and 0.1 part of benzophenone. A Pyrex glass tube is charged with the solution and sealed after replacing the air in the tube with argon. The tube is immersed into a constant temperature bath maintained at 30°C and irradiated all the day by ultraviolet rays from a 400W high voltage mercury lamp at a distance of 30 cm. After opening the tube, the reaction mixture is worked up in a manner as described in Example 10 to obtain as a yellowish brown powder a copolymeric resin soluble in the same solvents in a yield of 80 percent. This resin contains 8.2 percent of 2-vinylquinoline unit, 36.1 percent of p-vinylphenyl glycidyl ether unit and 55.7 percent of methyl methacrylate unit. The resin is converted into an insoluble, infusible resin when air dried and heated at 80°C for 10 minutes.

EXAMPLE 12

In a mixed solvent (1:1) of acetone and ethyl ether are dissolved 50 parts of N-vinylglycidylurethan, 5 parts of 2-vinylisoquinoline and 145 parts of acrylonitrile. A glass tube similar to that described in Example 10 is charged with the solution, sealed while expelling the air in the tube, and then irradiated at 30°C for 200 hours by γ-rays (2.18×10⁴ γ/hour) from Co⁶⁰. The reaction mixture is treated as described in Example 10 to obtain in a yield of 72 percent a soluble copolymer containing 62 percent of vinylisoquinoline unit and 24.1 percent of N-vinylglycidylurethan unit. An insoluble, infusible film is obtained when a film of the soluble copolymer is air dried and then heated at 90°C for 20 minutes.

EXAMPLES 13–16

Using various combinations of epoxides, tertiary amines and unsaturated monomers, copolymerization reactions are carried out in a manner similar to that described in Example 10 to obtain white to brown powdery copolymers which are soluble in inert atmosphere or under reduced pressure drying but convert into insoluble, infusible resins when allowed to stand in the air at room temperature. It is observed that curing of the soluble resins is accelerated at heating at 60°–100°C.

The results are shown in the following Table 1:

TABLE 1

| Ex. No. | Monomers Used (Parts) | Initiator (Parts) | Reaction Condition | Yield (%) | Composition of Resulting Copolymer (%) |
|---|---|---|---|---|---|
| 13 | allyl glycidyl ether (80) vinyl acetate (11.5) N,N-dimethyl-aminostyrene (5) | benzoyl peroxide (0.1) | 60°C 1 day | 80 | allyl glycidyl ether (41.5) vinyl acetate (49.3) N,N-dimethyl-aminostyrene (9.2) |
| 14 | vinyl 10,11-epoxyundecanoate (50) chloroethyl vinyl ether (14.4) vinylpicoline (6) | azo-bis-isobutyronitrile (0.5) | 50°C 2 days | 77 | vinyl 10,11-epoxyundecanoate (28.9) chloroethyl vinyl ether (62.8) vinylpicoline (8.3) |
| 15 | γ-glycidoxy-propyldimeth-oxyvinylsilane (40) vinylcyclohexane (154) 2-vinylpyridine (6) | azo-bis-isobutyronitrile (0.5) | 60°C 1.5 days | 95 | γ-glycidoxydi-methoxyvinyl-silane (24.0) vinylcyclohexane (68.8) 2-vinylpyridine (7.2) |
| 16 | glycidyl p-vinyl benzoate (90) styrene (100) N,N-diethyl-aminoethyl vinyl ether (10) | azo-bis-isobutyronitrile (0.5) | 60°C 1 day | 96 | glycidyl p-vinyl benzoate (33.8) styrene (62.1) N,N-diethylamino-ethyl vinyl (4.1) |

EXAMPLE 17

In 100 parts of benzene and 50 parts of tetrahydrofuran are dissolved 100 parts of styrene, 100 parts of 3-(1,2-epoxypropyl)-4-vinylpyridine and 1.5 parts of benzoyl peroxide. A hard test tube is charged with the solution, sealed in vacuo and then kept at 60°C for 48 hours to effect reaction. Petroleum ether is added to the reaction mixture thus obtained and the precipitate formed is collected by filtration. A soluble polymer is thus obtained in a yield of 98 percent, which converts into an insoluble, infusible polymer when dried at room temperature for 24 hours. A film manufactured from 100 parts of the polymer dissolved in 50 parts of benzene and 50 parts of methyl isobutyl ketone is dried at 80°C for 15 minutes to obtain a cured film which has a Gardner impact strength (22 gauge steel) of 172 inch-pounds. No change is observed in a bending test (one-eighth-inch bending) and also in a test wherein the polymer is immersed in toluene (24 hours) or gasoline (24 hours).

EXAMPLE 18

As described in Example 1, 60 parts of N-allyl-N-epoxypropylaniline, 60 parts of methyl acrylate, 80 parts of styrene and 1.0 part of cumene hydroperoxide are dissolved in 50 parts of benzene and 50 parts of tetrahydrofuran. A steel reactor is charged with the solution, sealed in vacuo and maintained at 50°C for 2 days to effect reaction. The reaction mixture is then treated in a manner similar to that described in Example 1 to obtain in a yield of 90 percent a copolymer containing 38.7 percent of N-allyl-N-epoxypropylaniline unit, 29.1 percent of methyl acrylate unit and 32.2 percent of styrene unit. A film manufactured from 30 parts of the copolymer dissolved in 40 parts of tetrahydrofuran and 60 parts of methyl ethyl ketone converts into an insoluble, infusible cured film when dried in the air at room temperature under atmospheric pressure. After heating at 100°C for 10 minutes, the cured film has a Sward-Rocker hardness of 45. No change is observed when the cured copolymer is immersed in toluene for 48 hours. When a solution of the copolymer is dried in an inert gas atmosphere or under reduced pressure, the soluble copolymer is obtained in the form of a yellow powder which is stable for one month or longer at room temperature when stored in an inert atmosphere or in a dry stream under reduced pressure.

EXAMPLE 19

In 200 parts of a mixed solvent (1:1) of acetone and ethyl ether are dissolved 50 parts of N-vinylglycidylurethan, 5 parts of 2-vinylisoquinoline and 145 parts of acrylonitrile. A glass tube similar to that used in Example 1 is charged with the solution, sealed while expelling the air in the tube, and then irradiated at 30°C for 200 hours by γ-rays ($2.18 \times 10^4$ γ/hours) from $Co^{60}$. The reaction mixture is worked up in a manner similar to that described in Example 1 to obtain in a yield of 92 percent a soluble copolymer containing 62 percent of vinylisoquinoline unit and 24.1 percent of N-vinylglycidylurethan unit. An insoluble, infusible film is obtained by air drying a film of the soluble copolymer and then heating at 90°C for 20 minutes.

EXAMPLE 20

In 200 parts of methyl ethyl ketone are dissolved 50 parts of N-vinyl-2-(1,2-epoxypropyl)imidazole, 50 parts of methyl methacrylate, 40 parts of styrene and 0.5 parts of benzophenone. A Pyrex glass tube is charged with the solution and sealed after replacing the air in the tube with argon. The tube is then immersed into a constant temperature bath kept at 30°C and irradiated all the day by ultraviolet rays from a 400W high voltage mercury lamp at a distance of 30 cm. After opening the tube, the reaction mixture is worked up as described in Example 1 to obtain a yellowish brown powder a copolymer soluble in the solvent in a yield of 80 percent. The copolymer is converted into an insoluble, infusible resin when air dried and then heated at 80°C for 10 minutes. However, the copolymer is stable in an inert gas atmosphere such as argon atmosphere even when allowed to stand at room temperature for one month or longer. The cured resin having a three-dimensional structure shows a Sward-Rocker hardness of 50 and a Gardner impact strength (22 gauge steel) of 170 inch-pounds. No change is observed when the cured resin is immersed in toluene or gasoline for 48 hours.

EXAMPLE 21

In 100 parts of benzene and 50 parts of ethyl acetate are dissolved 60 parts of glycidyl 3-vinylquinoline-4-carboxylate, 100 parts of methyl methacrylate, 50 parts of acrylonitrile and 2 parts of azo-bis-isobutyronitrile. In a manner similar to that described in Example 1, the reaction is carried out and the reaction mixture is treated to obtain a soluble copolymer in a yield of 90 percent. A film manufactured from a solution of the copolymer is heated at 80°C for 10 minutes to obtain a cured film which has a Sward-Rocker hardness of 51 and shows no change in a bending test (one-eighth-inch bending) and in toluene- and gasoline-resisting properties (immersion for 48 hours). A solution of the soluble copolymer is stable and shows neither a change in viscosity nor a decrease in the number of epoxy groups when allowed to stand for one month.

COMPARATIVE EXAMPLES

To give a basis for comparison with the products of the invention, several examples are set forth below representing the known practices in this art.

Comparison A

Using 95 parts of p-vinylphenyl glycidyl ether, 5 parts of N-vinyl-2-methyl-imidazole and 0.5 part of azo-bis-isobutyronitrile, a polymerization reaction is carried out in a manner similar to that described in Example 1. An infrared absorption spectrum analysis of the resulting resin and determination of its epoxy groups shows that 30% of the epoxy rings in the resin are already opened. This resin is not cured when allowed to stand at room temperature for 10 days in the air but does cure when heated at 90°C for 30 minutes. A film obtained by applying a solution of the resin onto a substrate to form a coating of 40 microns in thickness and heating at 150°C for 30 minutes has a Sward-Rocker hardness of 40. This film shows no change in appearance but exhibits a somewhat swollen state when carefully observed after immersion into toluene for 48 hours and is thus judged unsuitable for coating purposes.

For comparison with the process of this invention, the reaction is carried out using glycidyl methacrylate and N-vinyl-2-methylimidazole in place of N-vinyl-2-(1,2-epoxypropyl)imidazole used in Example 20 as an ethylenically unsaturated compound having both an epoxy group and a specific tertiary amino group. The reaction mode and the results are shown in the following Comparison B.

Comparison B

In 100 parts of xylene are dissolved 40 parts of styrene, 47 parts of ethyl acrylate, 10 parts of glycidyl methacrylate and 10 parts of N-vinyl-2-methylimidazole. Two grams of benzoyl peroxide are added to the solution and the mixture is heated at 50°C for 24 hours in a stream of nitrogen. The resulting resin solution shows no increase in viscosity when allowed to stand at room temperature for 10 days, although the number of epoxy groups and double bonds of the resin are decreased. A film obtained by applying the resin solution onto a substrate to form a coating of 30–40μ in thickness and heating it at 150°C for 30 minutes has a Sward-Rocker hardness of 40. The cured film shows no change in appearance but is swollen when dipped into toluene for 48 hours. The properties of this film are considerably inferior to those of the films in Examples 1–21.

EXAMPLES OF UTILITY

A-Paint Formulation

To illustrate the preperties of the polymers of this invention in a specific utility, several paint formulations are prepared using one of the present polymers and subjected to various tests as follows.

In 400 parts of acetone are dissolved 95 parts of glycidyl methacrylate, 5 parts of 2-vinylquinoline, 100 parts of styrene and 0.1 part of benzophenone. A stainless steel container is charged with the solution, sealed and irradiated at 30°C for 24 hours in argon atmosphere by ultraviolet rays from a 400W high voltage mercury lamp. After completion of the reaction, the container is opened and petroleum ether added to the reaction mixture to precipitate a copolymer which is then separated by filtration and dried under reduced pressure. A glycidyl methacrylate/2-vinylquinoline/styrene copolymer is thus obtained in the form of a yellowish brown powder, which contains 8.2 mol percent of 2-vinylquinoline unit, 5.7 mol percent of glycidyl methacrylate unit and 36.1 mol percent of styrene unit.

One hundred parts of the copolymer are dissolved in a mixture of 50 parts of benzene and 50 parts of methyl isobutyl ketone. A variety of pigments are incorportaed into the mixture to prepare a paint composition. Next, the paint composition is spread over an aluminum plate to form a film which is then dried at 80°C for 30 minutes to form a cured film. Various properties of the cured film are shown in Table 2 below.

TABLE 2

| Paint Formulation | No. 1 | No. 2 | No. 3 | No. 4 |
|---|---|---|---|---|
| Components | | | | |
| Copolymer | 100 parts | 100 parts | 100 parts | 100 parts |
| Benzene | 50 parts | 50 parts | 50 parts | 50 parts |
| Methyl isobutyl ketone | 50 parts | 50 parts | 50 parts | 50 parts |
| Titanox RA 50 | — | — | 140 parts | 140 parts |
| Chrome Yellow | — | 200 parts | — | — |
| Copper phthalocyanine blue | — | — | — | 4 parts |
| Penetrating agent | — | — | — | 2 parts |
| Properties | | | | |
| Color tint | transparent | yellow | white | navy blue |
| Gardner impact strength (22 gauge steel) | 172 in-lbs. | 172 in-lbs. | 172 in-lbs. | — |
| Abrasion-resistance (500 cycles; quantity of loss - gms) | 0.00054 | 0.0046 | 0.0036 | 0.0040 |
| Sward-Rocker hardness | 59 | 60 | 60 | 60 |
| Bending test (⅛-inch bending) | no change | no change | no change | no change |
| Exposure test (outdoor) | more than 3 months | more than 3 months | more than 3 months | more than 3 months |
| Fade test (100 hrs) | no change | no change | no change | no change |
| Brine-resistance (1000 hours) | " | " | " | " |
| Cold-resistance (25 cycles; -40-200°F) | " | " | " | " |
| Boiling water-resistance (30 minutes) | " | " | " | " |
| Alkali-resistance (20% NaOH; 170°C, 2 hrs) | " | " | " | " |
| Acid-resistance (20% acetic acid) | " | " | " | " |
| Toluene-resistance (24 hours) | softened | softened | softened | softened |
| Gasoline-resistance | no change | no change | no change | no change |

The above tabulated results shows that the polymers and copolymers obtained according to the process of this invention are useful as a binder for paints.

B-Adhesive

The utility of the present polymers as an adhesive is shown below:

In 500 parts of tetrahydrofuran are dissolved 90 parts of p-vinylphenyl glycidyl ether, 5 parts of 2-vinylquinoline, 100 parts of methyl methacrylate and 1 part of azo-bis-isobutyronitrile. A stainless steel confined container is charged with the solution and heated, while maintaining the inner space in vacuo, at 50°C for 2 hours. After cooling the reactor to room temperature, it is opened and petroleum ether is added to the reaction mixture to precipitate a polymeric product which is then separated by filtration and dried at room temperature under reduced pressure. A copolymer containing 4.6 mol percent of 2-vinylquinoline unit, 57.2 mol percent of methyl methacrylate unit and 38.2 mol percent of p-vinylphenyl glycidyl ether unit is thus obtained in a yield of 95 percent as a white powdery substance.

To 100 parts of the copolymer are added 50 parts of xylene and 50 parts of acetone and the resulting solution is applied onto one side of each of two well cleaned stainless steel panels and allowed to stand for a while. The two panels are arranged in face-to-face contact with the copolymer-coated surfaces of the two panels facing each other, and then heated at 150°C for 10 minutes under pressure panels. The resultant joint between the panels has a strength in shear of 1,400 lbs./in$^2$.

What is claimed is:

1. A process for the production of polymers capable of self-curing at room temperature, characterized by subjecting to free radical polymerization in a non-protonic solvent a monomeric material consisting essentially of at least one ethylenically unsaturated monomer having at least one epoxy group and a tertiary amino group selected from the group consisting of an N,N-disubstituted amino group, a pyridyl group, a quinolyl group and an isoquinolyl group.

2. A process for the production of polymers capable of self-curing at room temperature, characterized by subjecting to free radical polymerization in a non-protonic solvent a monomeric material consisting essentially of:
- a. at least one ethylenically unsaturated monomer having at least one epoxy group connected to the ethylenically unsaturated group through a tertiary amino group, a pyridyl group, a quinolyl group, or an isoquinolyl group with
- b. at least one other ethylenically unsaturated monomer free of active hydrogen-containing groups, said other monomer being present in an amount of about 0.5–1,000 mole percent based on the epoxy substituted ethylenically unsaturated monomer (a).

3. A polymer self-curing at room temperature of at least one ethylenically unsaturated monomer having at least one epoxy group connected to the ethylenically unsaturated group through a tertiary amino group, a pyridyl group, a quinolyl group, or an isoquinolyl group.

4. A copolymer self-curing at room temperature of (a) at least one ethylenically unsaturated monomer having at least one epoxy group connected to the ethylenically unsaturated group through a tertiary amino group, a pyridyl group, a quinolyl group, or an isoquinolyl group with (a) at least one other ethylenically unsaturated monomer free of active hydrogen-containing groups, said other monomer being present in an amount of about 0.5–1,000 mole percent based on the epoxy substituted ethylenically unsaturated monomer (a).

* * * * *